(12) United States Patent
Sowards et al.

(10) Patent No.: US 6,520,205 B1
(45) Date of Patent: Feb. 18, 2003

(54) COMPRESSOR UNLOADER SYSTEM

(75) Inventors: Brian D. Sowards, Mooresville, NC (US); Eugene Cheng, Plano, TX (US)

(73) Assignee: Ingersoll-Rand Company, Woodcliff Lake, NJ (US)

( * ) Notice: Subject to any disclaimer, the term of this patent is extended or adjusted under 35 U.S.C. 154(b) by 0 days.

(21) Appl. No.: 09/642,944

(22) Filed: Aug. 22, 2000

(51) Int. Cl.$^7$ ................................................. F16K 31/12
(52) U.S. Cl. ............... 137/601.13; 137/540; 137/513.5; 251/284
(58) Field of Search ....................... 137/601.13, 599.01, 137/528, 535, 540, 538, 513.3, 513.5; 251/284

(56) References Cited

U.S. PATENT DOCUMENTS

| | | |
|---|---|---|
| 1,109,154 A | 9/1914 | Thomas |
| 1,186,247 A | 6/1916 | Ver Planck |
| 1,806,925 A | 5/1931 | Trapper |
| 2,275,303 A | 3/1942 | Mantle |
| 2,500,806 A | 3/1950 | Dalrymple |
| 2,728,517 A | 12/1955 | Schumaker |
| 2,804,878 A | 9/1957 | Fishwood et al. |
| 2,948,293 A | 8/1960 | Gerteis |
| 3,192,953 A | 7/1965 | Wolf et al. |
| 4,060,340 A | 11/1977 | Yanik et al. |
| 4,321,940 A * | 3/1982 | Krechel et al. ...... 137/514.7 X |
| 4,396,345 A | 8/1983 | Hutchinson |
| 4,406,489 A | 9/1983 | Trabert |
| 4,406,589 A | 9/1983 | Tsuchida et al. |
| 4,447,193 A | 5/1984 | Bunn et al. |
| 4,575,323 A | 3/1986 | Yoshimura |
| 4,704,069 A | 11/1987 | Kocher et al. |
| 4,710,108 A | 12/1987 | Soupal |
| 4,778,351 A | 10/1988 | Sowards et al. |
| 4,993,922 A | 2/1991 | Lauterbach et al. |
| 5,388,968 A | 2/1995 | Wood et al. |
| 5,435,704 A | 7/1995 | Sawyer |
| 5,456,582 A | 10/1995 | Firnhaber et al. |
| 5,525,047 A * | 6/1996 | Sternenberg et al. ... 251/282 X |
| 5,540,558 A | 7/1996 | Harden et al. |
| 5,548,673 A | 8/1996 | Kitamura et al. |

FOREIGN PATENT DOCUMENTS

| | | |
|---|---|---|
| EP | 0855 519 A2 | 7/1998 |
| GB | 251934 | 6/1926 |
| GB | 2 116 754 A | 9/1983 |

* cited by examiner

Primary Examiner—Kevin Lee
(74) Attorney, Agent, or Firm—Michael Best & Friedrich LLP

(57) ABSTRACT

A system and method for controlling air flow into a rotary screw compressor is provided. The system includes an unloader valve for controlling airflow into the compressor. An anti-rumble system may be included in the unloader valve housing. The unloader valve is an air operated sleeve-type valve. The anti-rumble system includes an integrated vent path for the discharge side of the compressor. All moving parts are sealed within the unloader housing to prevent malfunction due to dirt entering the mechanism.

15 Claims, 7 Drawing Sheets

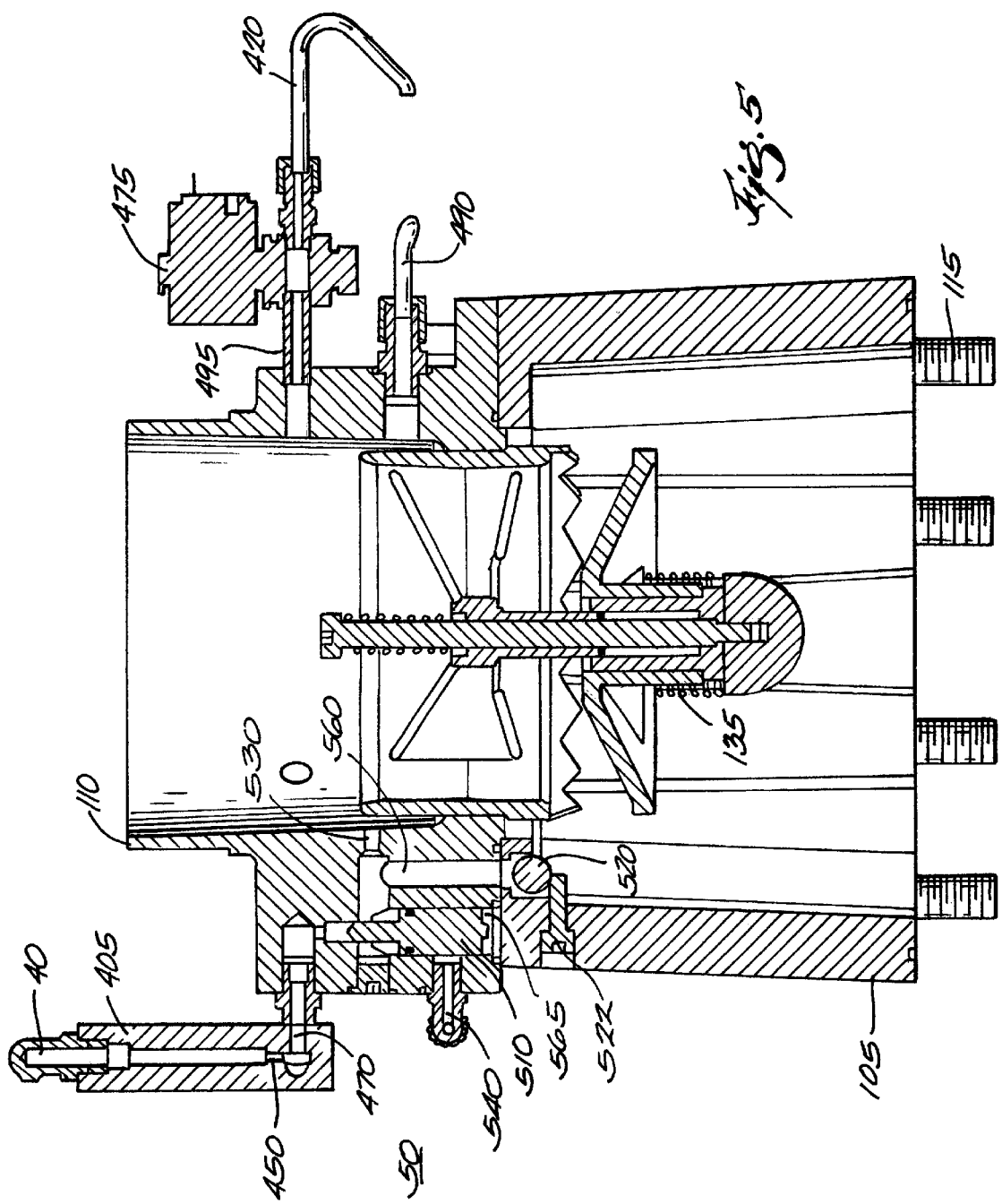

COMPRESSOR UNLOADER SYSTEM

BACKGROUND

The present invention relates to air compressors. More particularly, the invention relates to controlling the air provided to the suction side of a rotary screw type air compressor.

Conventional rotary air compressors have an inlet valve that controls air flow to the inlet or suction side of the compressor. The inlet valve throttles flow when load on the compressor is diminished and shuts fully when the load on the compressor is removed. The inlet valve is commonly referred to as an unloader valve. The compressor is loaded when the inlet valve is open permitting air to flow through the compressor inlet. The compressor is unloaded when the valve is closed to block flow through the compressor inlet.

Unloader valves are typically designed to prevent backflow through the compressor inlet. Backflow typically includes a mixture of air and oil and may occur when the compressor is stopped while the discharge side of the compressor is pressurized. Backflow is a problem because of the associated loss of oil to the system, and potential environmental contamination. One conventional method of preventing backflow is to provide a check valve in the air service and oil injection lines.

Conventional unloader valves may be opened and closed pneumatically. Pneumatically controlled unloader valves require a control air system for operation. Unloader valves may also be operated by a hydraulic system. Hydraulic unloader valves frequently leak hydraulic fluid and require replacement of parts, such as diaphragms, gaskets and the like. These conventional systems typically require operation of the valve against the air pressure associated with the compressor. For example, U.S. Pat. No. 5,540,558 to Harden discloses an unloader valve that is powered by an electric motor. To move the valve to the closed position, and place the compressor in an unloaded condition, the valve must be moved against the force of the incoming air being sucked into the compressor. The requirement to move the valve in opposition to the force of the incoming air complicates the control system for conventional unloader valves. Thus, there is a need for an unloader valve that may be operated easily without regard to the surrounding air flow.

The unloader valve reduces air flow entering the compressor to prevent excessive discharge pressure from occurring during a reduced load condition. As discussed above, when the compressor is completely unloaded, the unloader valve shuts. Destructive vibration of the compressor and excessive noise can occur when the unloader valve is completely shut and the compressor remains operational. The noise and vibration, commonly referred to as "rumble", occurs due to the mated screws continuing to rotate with no air flow.

Many compressors include "anti-rumble" systems to prevent compressor damage. A typical anti-rumble system may include a recirculation path for discharge air back through the rotors while the unloader valve is shut. For example, U.S. Pat. No. 4,396,345 to Hutchinson discloses an anti-rumble system in which air is recirculated from a oil/air separator tank on the discharge of the compressor back to the compressor inlet. U.S. Pat. No. 4,406,589 to Tsuchida also discloses an anti-rumble system in which air from the discharge of the compressor recirculates through the compressor when the unloader valve is shut. These conventional anti-rumble systems typically require expensive pilot or solenoid valves that are typically mounted on the exterior of the compressor housing. Thus, there is a need for an anti-rumble system that is incorporated into the housing of the unloader valve.

In addition, most conventional compressors include a vent path to relieve excessive compressor discharge pressure. Like the anti-rumble system, the vent path removes air from the discharge side of the compressor. In conventional compressors, the vent path and anti-rumble system are separated, further complicating the design and increasing the amount of air piping and control systems. At present, the applicants are aware of no system combining the compressor discharge vent and anti-rumble system into a single system that uses the same compressor discharge pressure. Such an improvement would greatly simplify the current systems and reduce the manufacturing costs of the compressor.

The conventional unloader systems and compressors described above typically require several valves and associated operating systems to be mounted on the compressor casing. Thus, the moving elements of the systems are exposed to the environment. As compressors are operated in many harsh environments, such as, for example, sandy and dusty construction sites, these moving components can become dirty or damaged. There remains a need to develop a compressor unloader system with parts and components that are contained within the compressor casing.

SUMMARY OF THE INVENTION

According to one aspect of the present invention an inlet unloader valve for a rotary compressor is provided. The valve comprises a hollow sleeve having a circumferential bottom seating surface and a spring for biasing the sleeve downward toward a seated condition. The sleeve may be positioned so that air flowing into the compressor moves through the hollow interior of the sleeve and under the circumferential bottom seating surface. The valve may further include a seating member positioned below the sleeve so that the bottom seating surface contacts the seating member to close the valve. Sleeve type valves typically have low opening and closing forces when compared to more conventional poppet type valves. The seating member may be biased upwardly toward the sleeve. The valve may be configured to permit leakage past the valve when the valve is in a seated condition.

The valve may further comprise a centrally located guide rod disposed within the sleeve and extending along the longitudinal axis of the sleeve to thereby providing a guide when the sleeve moves in the axial direction. The sleeve may include a centrally located hub for receiving the guide rod. The valve housing may include a mechanical stop that contacts the sleeve and limits the upward motion of the sleeve. The guide rod may be secured to the valve housing. The valve may be air operated and may include an air passage for carrying control air to the bottom of the sleeve for forcing the sleeve in the upward direction to open the valve.

The present invention is also directed to a compressor anti-rumble system. The system may comprise a supply of pressurized air; a first passage positioned to vent the supply of pressurized air to the inlet of the compressor upstream of a compressor inlet valve; a second passage positioned to direct the supply of pressurized air to the inlet of the air compressor downstream of the compressor inlet valve; and a control valve positioned between the air supply and the first and second passages. The anti-rumble system may be configured so that the pressurized air includes oil that lubricates the compressor inlet valve. Preferably, the first and second passages are formed in a housing containing the compressor inlet valve. The compressor inlet valve may be a sleeve type valve.

In yet another alternative embodiment the invention is directed to an inlet air control system for an air compressor. The system may comprise an unloader valve positioned within an unloader housing to control the flow of air into the inlet of the air compressor; an anti-rumble control valve positioned in the housing between a supply of pressurized air and the inlet of the compressor downstream of the unloader valve. The system provides for a flow path for air from the supply of pressurized air through the anti-rumble control valve and into the air compressor to exist when the main unloader valve is shut and the compressor is operating.

The invention includes a system for controlling an air compressor unloader valve comprising a first control element for controlling the operational mode of the unloader valve, wherein the unloader valve operational modes include a shutdown mode and an automatic control mode, wherein the unloader valve is closed in the shutdown mode; and a second control element for controlling the position of the unloader valve when the unloader valve is in the automatic control mode. The first and second control elements may include solenoid valves.

The second control element may vary the position of the unloader valve based on the discharge pressure of the compressor and may include a control air system for supplying control air to operate the unloader valve. The second control element may be configured to close the unloader valve when compressor discharge pressure reaches a predetermined value. Preferably, the second control element includes an adjustment mechanism for selecting predetermined values of compressor discharge pressures. The adjustment mechanism may be electrical or mechanical in nature.

The present invention may also be directed to a system for operating a pneumatically controlled compressor unloader valve. The system may comprise a first solenoid valve located in a passage for carrying pressurized air to a control air system for operating the unloader valve. The control air system includes a control air passage for carrying the pressurized air to the unloader valve and a control valve for controlling the position of the unloader valve by controlling the pressure of the air in the control air passage. The control valve may be air operated and may be positioned to vent the control passage when the control valve is open.

Preferably, the pressurized air is supplied from the discharge of the air compressor so that the control valve opens when compressor discharge pressure reaches a predetermined value. The system may also include a second solenoid valve located in a passage for carrying pressurized air for biasing the control valve towards a valve seat.

In another alternative embodiment the present invention is directed to an air system for operating an unloader valve for a compressor. The air system includes a supply of pressurized air; a control air header for providing operating air to the unloader valve; and a control valve for controlling pressure in the control air header. The control valve is configured to open and connect the control air header to a vent path thereby causing the unloader to valve shut. The control valve is preferably spring biased in the closed position. The system may include a supplemental biasing mechanism to change the force that the spring applies to the control valve. The supplemental biasing mechanism may be a pressurized air system, mechanical linkage or an electrical linkage.

In yet another embodiment the invention is directed to a rotary screw type air compressor. The compressor may comprise an air operated unloader valve for controlling the flow of air from an air supply into the inlet of the compressor; a control air system for operating the unloader valve. The unloader valve may comprise a sleeve valve. The compressor may also include an anti-rumble system for supplying air to the compressor inlet when the unloader valves are shut and the compressor is running.

The anti-rumble system may further comprise a control valve located in a passage between the compressor discharge and a vent passage and between the compressor discharge and the inlet of the compressor so that when the control valve is open the compressor discharge is operatively connected to the vent passage and to the inlet of the compressor.

Yet another embodiment of the present invention is directed to a method of operating a rotary air compressor comprising the steps of closing a unloader valve at the inlet of the compressor; starting the compressor; providing leakage by the unloader valve during compressor startup; and opening the unloader valve when the pressure reaches a first predetermined value. The method may include the additional steps of shutting the unloader valve when compressor discharge pressure reaches a second predetermined value.

The present invention is also directed to a method of operating an air compressor unloader valve. The method includes the steps of applying a closing force to maintain the unloader valve in the closed position; pressurizing a control air header to open the valve, wherein the control air header supplies air to the unloader valve and applies sufficient opening force to the valve to overcome the closing force on the valve; and depressurizing the control air header to close the valve. The step of depressurizing the control header may occur at a predetermined value of air compressor discharge pressure.

BRIEF DESCRIPTION OF THE DRAWINGS

These and other features, as aspects, and advantages of the present invention will become apparent from the following description, appended claims, and the accompanying exemplary embodiment shown in the drawings, which are briefly described below.

FIG. 5 is a cross-sectional view of the unloader valve and an anti-rumble system taken through line B—B of FIG. 3;

DETAILED DESCRIPTION

Although references are made below to directions, such as left, right, up, down, etc., in describing the drawings, they are made relative to the drawings (as normally viewed) for convenience. These directions are not intended to be taken literally or limit the present invention in any form.

A control system and method according to an embodiment of the present invention are provided to control the flow of air into an air compressor. Preferably, this system is designed to be used in conjunction with a rotary screw type air compressor. The control system may comprise an unloader valve 10, a control air system 40, and an anti-rumble system 50.

Figure 1:
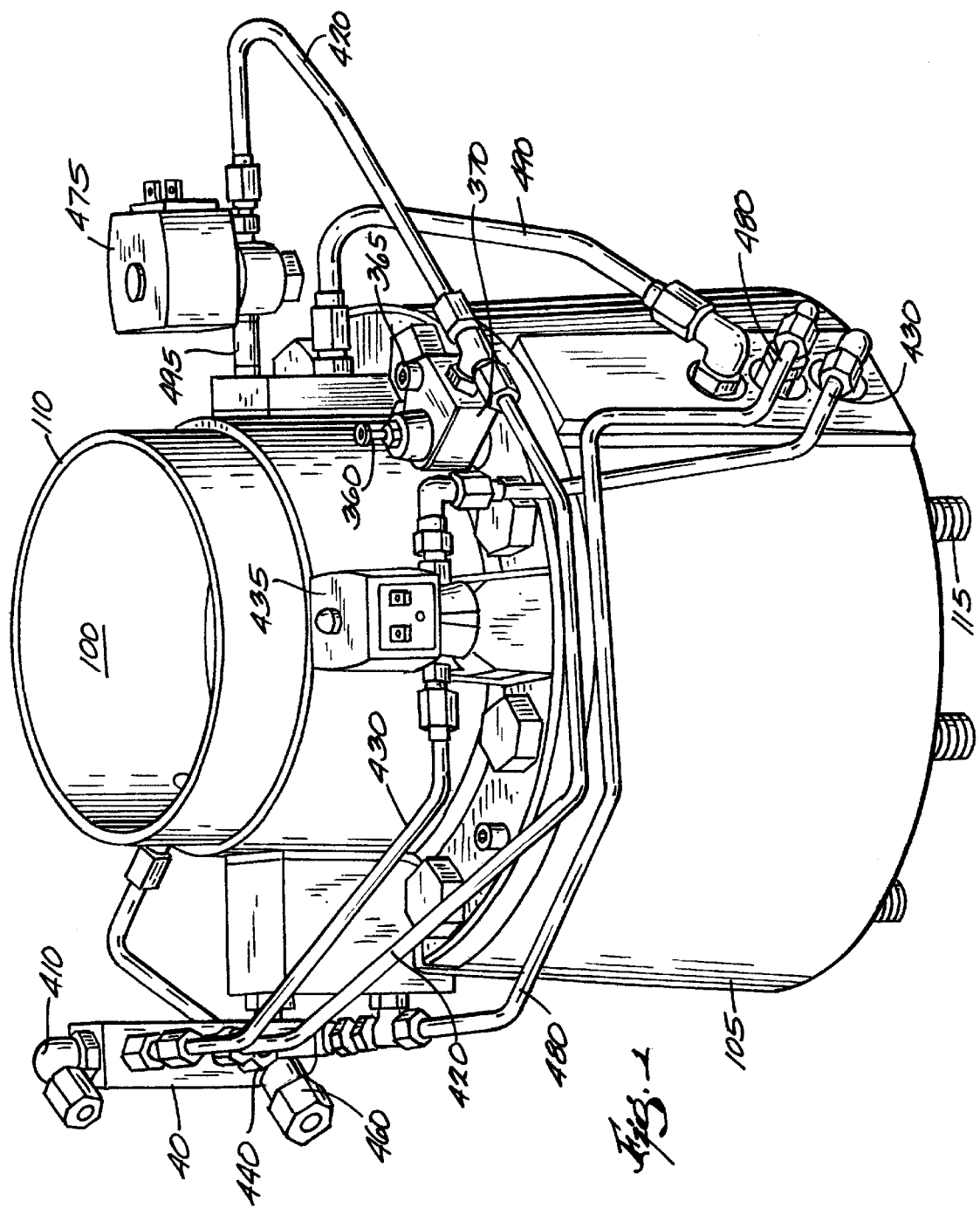
FIG. 1 is a front perspective view of the unloader system of the present invention.

The inlet air control system is shown in FIG. 1. The various components of the system are contained within an unloader valve housing 100 which includes an upper housing 110 and lower housing 105.

The control air system 40 is an enclosed system that carries air in and around the housing. A significant advantage of the system is that no moving parts or linkages are exposed to harsh environment in which compressors are typically operated. All moving parts are sealed within the unloader housing 100 to prevent malfunction due to dirt entering the mechanism. The unloader valve 10 and the anti-rumble system 50 are contained within the housing 100 and adjacent structure, thus avoiding exposure to the external environment.

Unloader Valve

The unloader valve 10 is a sleeve type valve. The sleeve 125 rests within the unloader valve housing 100. The housing 100 may be connected to the casing of the air compressor using bolts 115 shown in FIG. 2. The unloader valve controls the flow of air from the region A outside the compressor to the region B within the housing 100 at the inlet of the compressor. The air flow is indicated by the arrows shown in FIG. 4.

Figure 3:
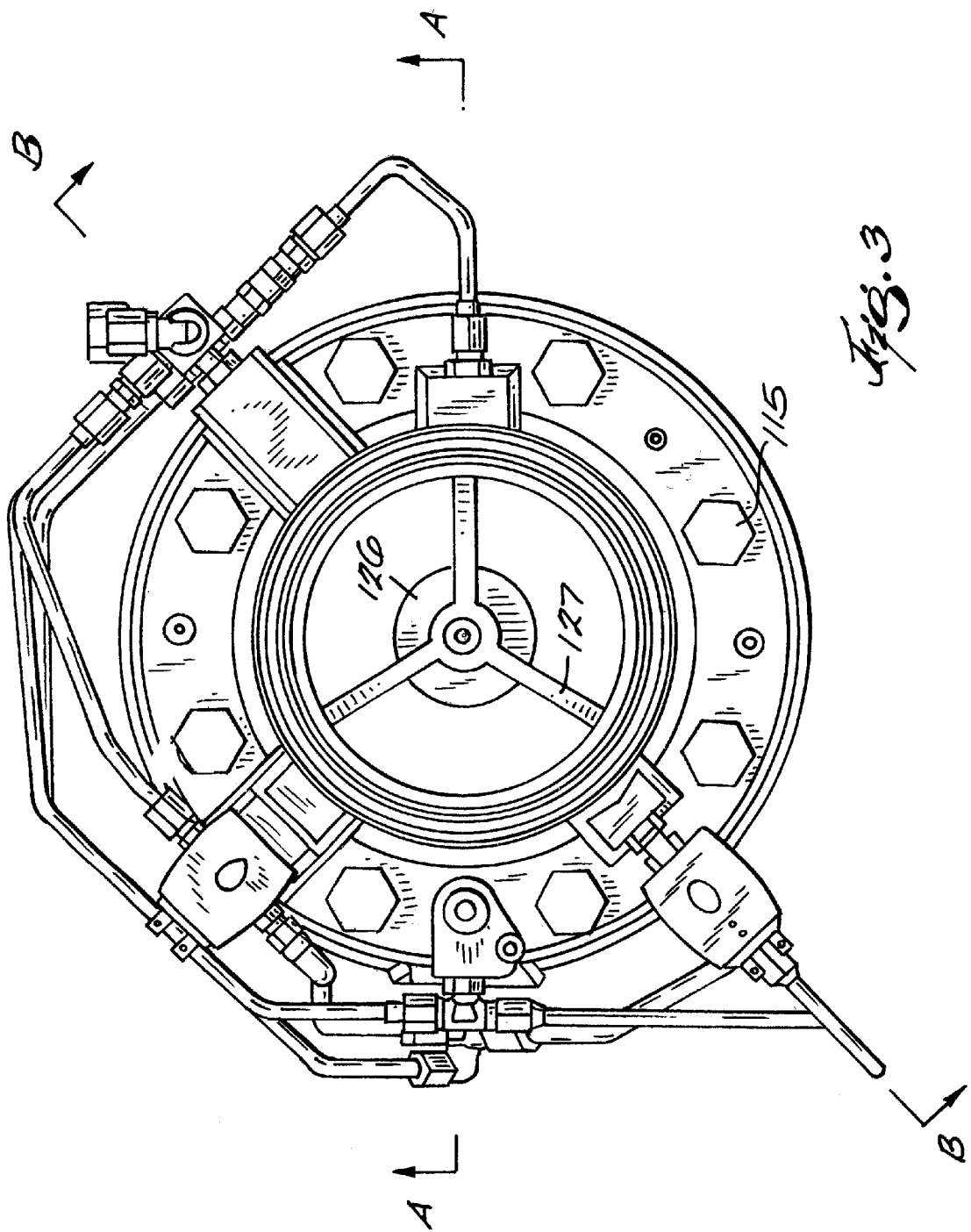
FIG. 3 is a top plan view of the unloader system of FIG. 2.

The sleeve 125 is preferably cylindrically shaped. As shown in FIG. 3, the sleeve 125 may include radial spokes 127 connected to an interior centrally located hub 126. The hub 126 is positioned around a bolt shaped guide rod 140. The guide rod 140 is secured to the housing 100 through threaded a end portion 143. The guide rod 140 may be securely fastened to the housing 100 by rotating the integrally formed head 145 in a conventional manner. A socket wrench or a screwdriver, for example, may be employed.

Figure 4:
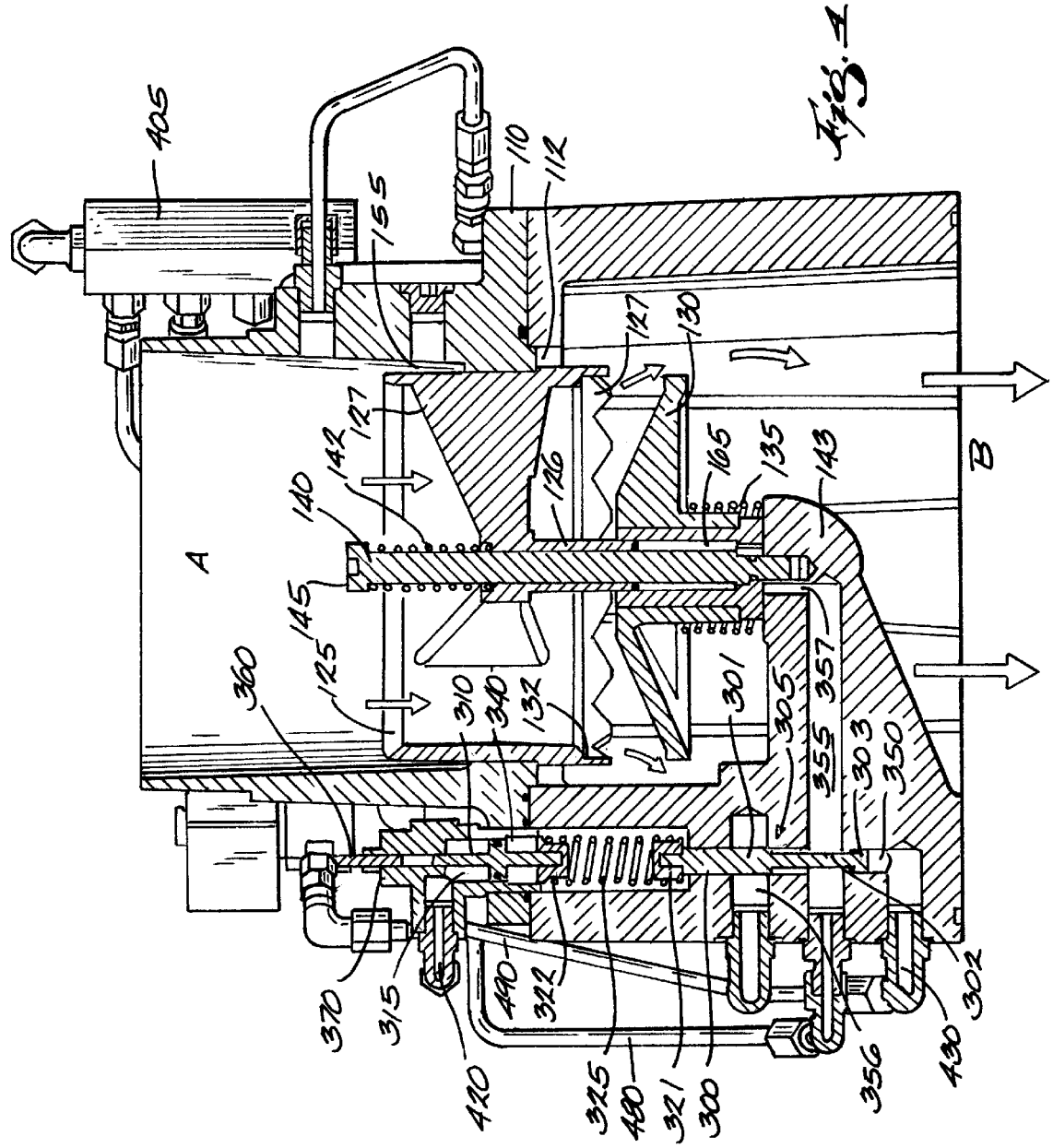
FIG. 4 is a cross-sectional view of an unloader valve taken through line A—A of FIG. 3.

As shown in FIGS. 4 and 5, the valve may include a seating member 130 positioned below the sleeve. The seating member 130 is preferably disk shaped and provides a surface against which the sleeve 125 makes contact to close the unloader valve 10. The bottom circumferential surface of the sleeve 125 contacts the seating member 130 at a substantially flat seating surface 132 as shown in FIG. 4. The seating member 130 is biased upwardly by a spring 135. The spring provides sufficient force to maintain the seating member 130 upwardly positioned when air flow into the compressor does not exist. However, when air is drawn through the sleeve 125, and into the compressor inlet B, the seating member 130 is forced downward and the spring 135 is compressed. While the seating member 130 is biased upwardly by the spring 135, the sleeve 125 is biased downwardly by spring 142. The coiled spring 142 surrounds the guide rod 140 and contacts an upper surface of the hub 126. When the sleeve 125 moves upward to open, spring 142 is compressed.

The sleeve 125 may include a tooth shaped bottom edge 127. The serrated bottom 127 provides for improved throttling characteristics over conventional sleeve valves. Sleeve valves have non-linear flow patterns (i.e. small initial movement of the sleeve produces large flow increases). Thus, the toothed shaped bottom 127 may be provided to compensate for the non-linear flow characteristics of the unloader valve by providing a smaller opening for air into the suction side of the compressor in low demand conditions.

The inner diameter of the upper housing section 110 matches the exterior diameter of the sleeve 125. When the sleeve is in place within the housing 110, a small clearance 155 exists between the exterior of the sleeve 125 and the interior wall of the housing 110. The clearance 155 permits the leakage of air around and past the sleeve 125 even when the sleeve is seated against the seating member 130. The flow of leakage air through the clearance 155 may occur, for example, when the unloader valve 10 is shut and the air compressor is running.

Figure 8:
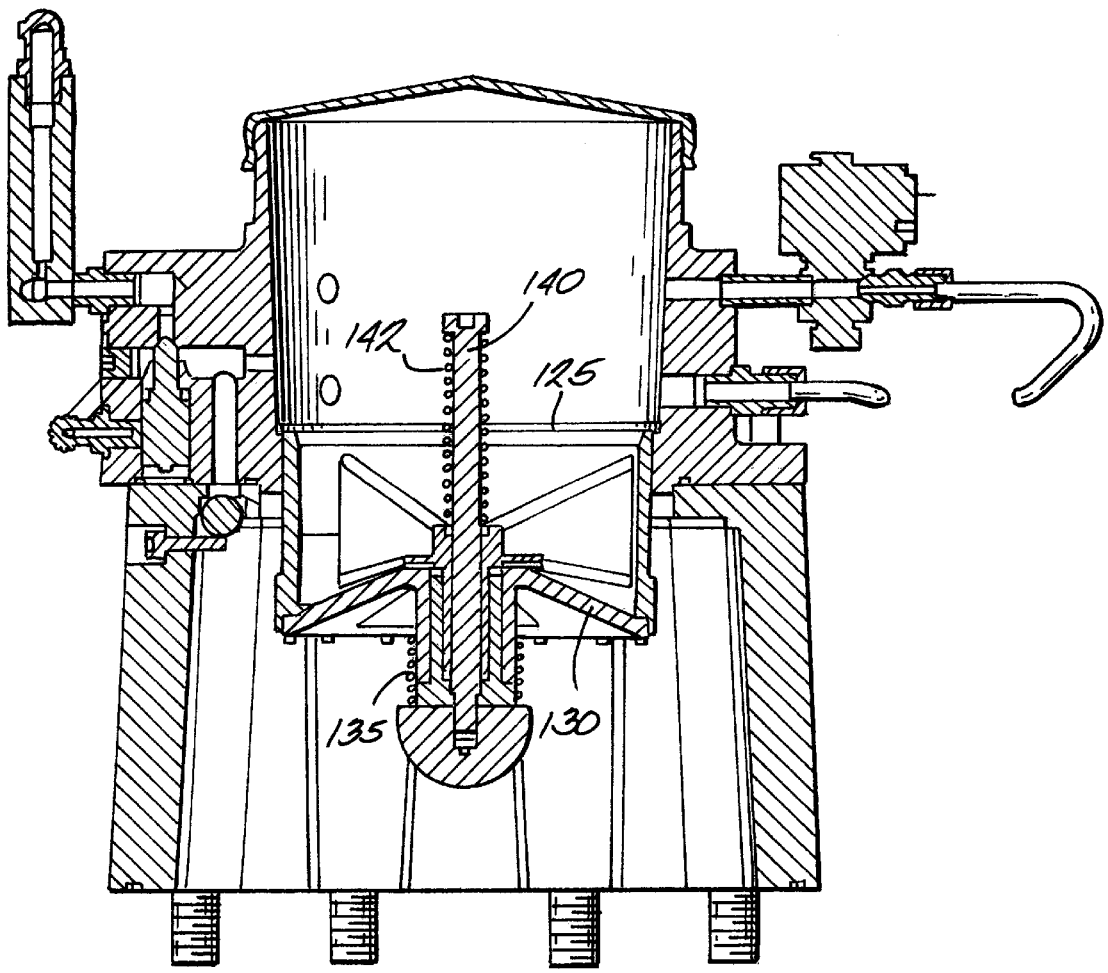
FIG. 8 is the cross-sectional view shown in FIG. 5 with the unloader valve in the unloaded position.

The unloader valve 10 further includes an annular chamber 165 located around the guide rod 140. The guide rod chamber 165 is provided to receive pressurized air supplied below the hub 126 of the sleeve 125. When pressurized air is admitted into the chamber 165 the hub 126 and integrally connected sleeve 125 are forced upwards away from the disc 130, opening the unloader valve 10. When pressurized air is released from the chamber 165 the sleeve biasing spring 142 forces the sleeve 125 downward into contact with the seating member 130 to shut the unloader valve 10, as shown in FIG. 8. The pressure of the air within the guide rod chamber 165 is controlled by an unloader valve control system 30 discussed further below.

Unloader Valve Control System

The unloader valve control system 30 is contained within the unloader valve housing 100. The system 30 includes a control valve 300 and a Hi/Lo piston 310. A spring 325 is positioned between the control valve 300 and the Hi/Lo piston 310. Thus, the Hi/Lo piston 310 is contained within a Hi/Lo housing 370 and operatively connected to the control valve 300 by the spring 325. The control valve spring 325 biases the control valve 300 in the closed position.

As shown in FIG. 4, the control valve 300 is essentially a cylindrical piston having three sections of different diameters. The upper section 301 includes a lower spring locator 321 and abuts the bottom of the control valve spring 325. The middle section 302 has a smaller diameter than the upper section 301 of the control valve 300. The transition between the upper section 301 and middle section 302 occurs at the valve seat 305. The control valve 300 contacts a portion of the lower housing section 105 to shut the valve, as shown in FIG. 4. The bottom of the control valve 300 includes a section of larger diameter 303.

The middle section of the control valve 302 extends transversely across a horizontal control air passage 355 within the lower housing section 105. The passage 355 carries air to the bottom of the unloader valve hub 126. The control air passage 355 is operatively connected to the guide rod chamber 165 by a vertical bore 357 contained within the housing 105. The control air passage 355 is pressurized when pressurized air from a control air supply passage 351 leaks by the lower section 303 of the control valve 300. The diameter of the lower valve section 303 is predetermined so that when it is placed within the housing 105 an orifice or clearance 350 is provided between the lower valve 303 and the housing 105. The clearance 350 permits the control air passage 355 to be operatively connected to the air supply passage 351. The air supply passage 351 may be connected to the discharge end of the compressor and preferably is connected to a point in the discharge system where oil has been entrained in the compressed air. The entrained oil provides lubrication for the moving components of the control system 30 and the unloader valve 10.

The control system 30 further includes a vent passage 356. The vent passage 356 is operably connected to the control air passage 355 when the control valve 300 is open. The vent passage 356 is preferably connected to a region at atmospheric pressure in order to vent the control air passage 355. As shown in FIGS. 1 and 4, the vent passage 356 may be connected to the inlet of the unloader valve 10 through a conduit 490.

The unloader control valve 300 may open when the upper section 301 of the piston is forced upward off of the valve seat 305. The valve 300 moves upwardly when air pressure in the air supply passage 351 is sufficient to overcome the force applied to the top of the valve by the spring 325. The air in the air supply passage 351 applies a force on the bottom surface of the lower valve section 303. When the force on the bottom of the control valve 300 is sufficient, the valve opens and the control air passage 355 is connected to the vent passage 356 causing the pressure in the control air passage 355 to drop as the passage becomes vented to atmosphere. The guide rod chamber 165 is also vented through the vertical bore 357 causing the sleeve 125 to drop and the unloader valve 10 to shut.

The air pressure, normally compressor discharge pressure, at which the control valve 300 opens and the unloader valve 10 shuts, is determined by the force of the spring 325. The piston 310 includes an upper spring locator 322 and may be positioned to compress the spring 325 in order to increase the applied spring force. The piston 310 is forced downward by pressure in the Hi/Lo chamber 315. In a preferred embodiment, the Hi/Lo chamber 315 has two states, pressurized or unpressurized. When the chamber 315 is pressurized, the control valve 300 operates at the high setting. When the chamber 315 is unpressurized, the control valve 300 operates at a low setting.

At the high setting a higher compressor discharge pressure supplying the air supply passage 351 is required to unseat the control valve 300 due to the increased spring force generated by the compressed spring 325 when the chamber 315 is pressurized. The downward travel of the piston 310 is limited by a snap ring 340

The high and low settings for the control valve 300 may be adjusted. An adjusting screw 360 may be provided to limit the upward travel of the piston 310. The adjusting screw 360 may be moved to control the position of the piston 310 when the chamber is not pressurized and, thus, controls the low pressure setting for the control valve 300. Similarly, an adjusting screw 365 may be provided to vary the high pressure setting of the piston 310. As shown in FIG. 4, the Hi/Lo housing 370 is adjustably positioned within the lower and upper unloader housings 105, 110. The adjusting screw 365, shown in FIG. 1, is operated to move the housing 370 up or down. The snap ring 340 is rigidly connected to the housing 370 and moves with the housing 370 to vary the downward travel limit of the Hi/Lo piston 310. The position of the snap ring 340 determines the high pressure setting for the control valve 300.

Control System

Figure 6:
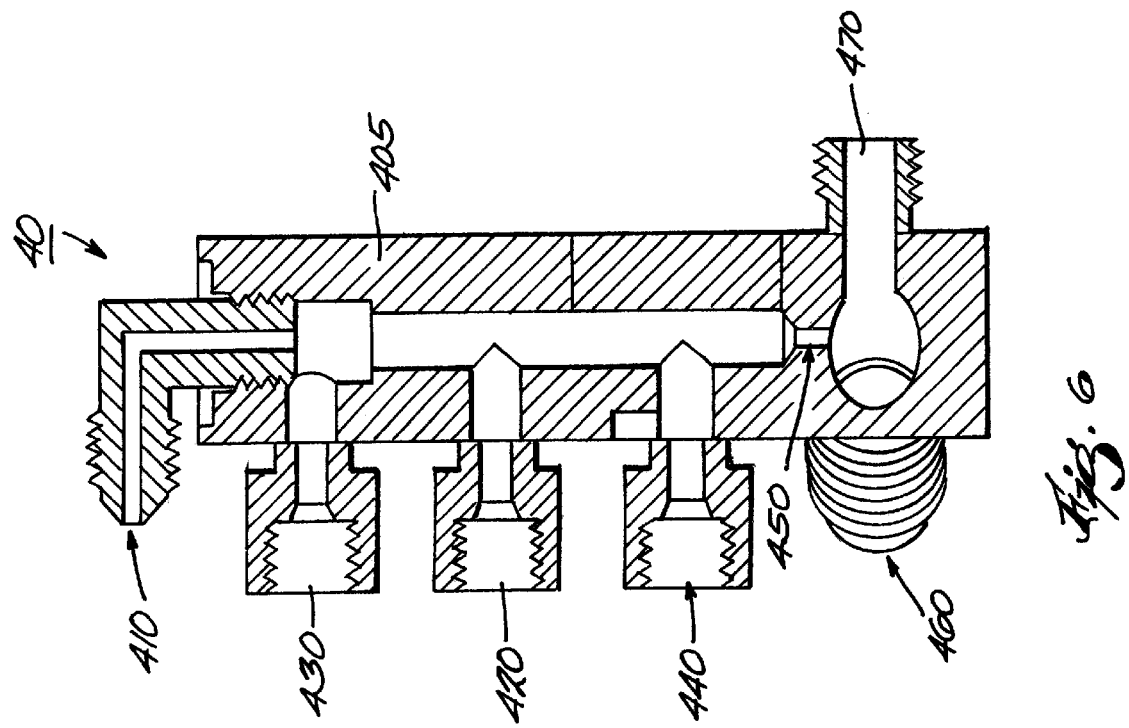
FIG. 6 is a cross-sectional view of a control air manifold according to the present invention.

A control air system 40 is provided for operating the unloader valve. As shown in FIG. 6, a control air manifold 405 is provided for receiving and routing air throughout the control air system. The manifold 405 includes a primary air supply conduit 410. The primary air supply originates on the discharge side of the air compressor. Preferably the primary air supply conduit 410 receives air from the "dry" side of an oil/air separator tank typically found on the discharge side of the air compressor.

Figure 2:
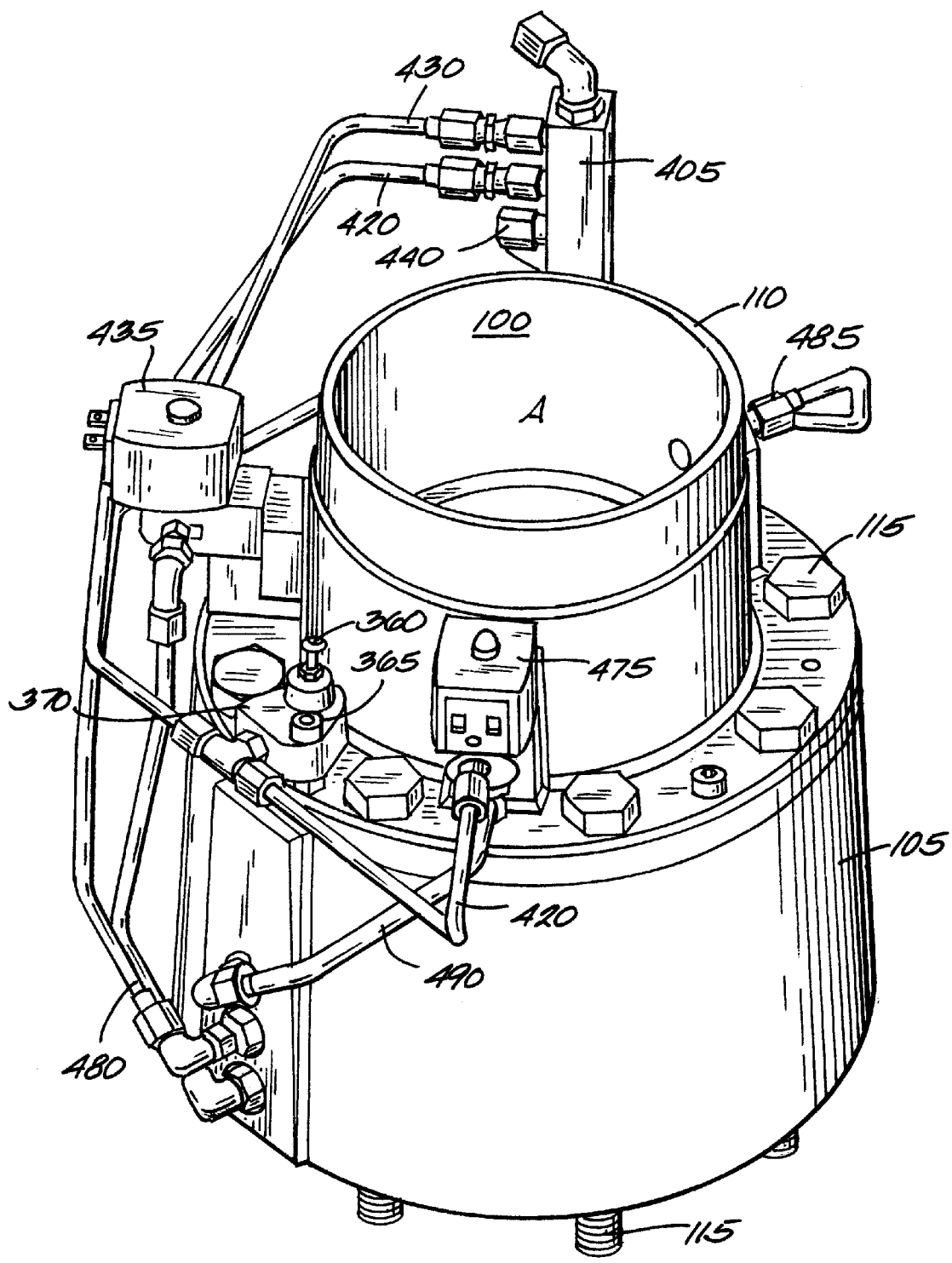
FIG. 2 is a right side perspective view of the unloader system of the present invention.

The manifold 405 is connected to an unloader valve air supply header 430. The header 430 is connected to the air supply passage 351 of the unloader valve and supplies pressurized air to operate the unloader valve. The pressure of the air contained within the supply header 430 is the same as the air pressure of the supply conduit 410. As shown in FIGS. 1 and 2, before pressurized air in the supply header 430 reaches the supply passage 351 it must pass through the load/unload valve 435. The valve 435 is preferably a solenoid operated valve. When the valve 435 is shut supply passage 351 is not pressurized and the unloader valve cannot open or, alternatively, if the unloader valve 10 is already open it shuts when the load/unload valve 435 shuts.

The manifold 405 is also connected to a passage 420 for supplying air to the Hi/Lo chamber 315. As shown in FIG. 1, the passage 420 is also connected to a Hi/Lo valve 475. The Hi/Lo valve 475 opens to connect the header 420 to a vent path 495. When the high low valve 475 is open the Hi/Lo air supply header 420 is connected to the vent path 495 and the header 420 may not be pressurized. Thus, the Hi/Lo chamber 315 may not pressurize and the unloader valve control valve 300 is placed in the low setting. The unloader valve will shut when discharge pressure reaches the low pressure setting. Similar to the load/unload valve 435, the Hi/Lo valve 475 is preferably a solenoid operated valve.

The manifold 405 also includes an auxiliary passage 440 which may be used to connect additional systems requiring pressurized air. Air in the anti-rumble supply header 470 is primarily supplied by the secondary supply air conduit 460. The second conduit 460 is connected to pressurized air on the discharge side of air compressor. But, unlike the primary supply conduit 410, which contains dry pressurized air the second conduit 460 is connected to the wet side of the oil water separator tank. Thus, a mixture of oil and air is provided to the manifold 405. The entrained oil found in the air provides lubrication for the unloader valve 10 and other moving components in the system. An orifice 450 is provided to allow a small amount of entrained oil to enter the air supply header 430 for lubrication. The operation and arrangement of the anti-rumble system 50 is described further below.

The control air system 40 also includes an unloader vent passage 490 as shown in FIG. 1. The vent passage 490 is connected to the vent passage 356 of the unloader valve control system 30. The other end of the vent path 490 is connected to the inlet of the air compressor upstream of the unloader valve designated by "A" in FIGS. 2 and 4.

The control air system 40 further includes a control air header 480. As shown in FIGS. 1 and 2, the control air header 480 carries control air from the control air passage 355 to various components of the inlet air control system as discussed further below. The control air header 480 is connected to an orifice 485 which permits a small amount of leakage from the header 480 to ensure the constant flow of air through the system. When the control valve 300 is open, the control air passage 355 and the control air header 480 are depressurized through the vent passage 490 causing the unloader valve to close.

The unloader valve and compressor inlet air flow may be further described as follows. The unloader valve control system may include a first control element that places the unloader valve in either the shutdown or automatic mode. The first control element may include, for example, the unloader shutdown valve 435. When the valve 435 is open the unloader valve operates in an automatic mode. When the valve 435 is shut the unloader valve is shut and in the shutdown mode.

The control system may also include a second control element for controlling the position of the unloader valve when the unloader valve is in the automatic mode. The second control element may include both the unloader valve control system 30 and the control air system 40 such as, for example, the control valve 300 and Hi/Lo valve 475. The second control element varies the position of the unloader control valve based on any number of parameters such as, for example, compressor discharge pressure as described herein.

Anti-Rumble System

Figure 7:
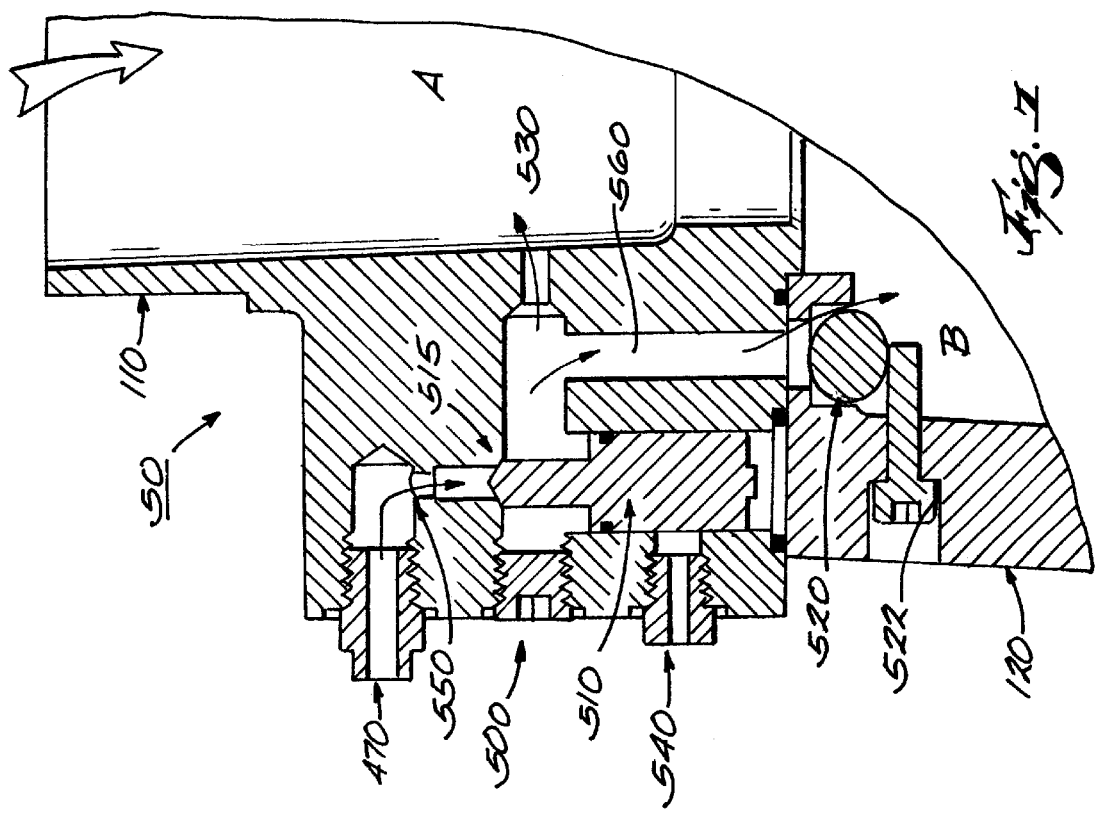
FIG. 7 is an enlarged cross-sectional view of the anti-rumble system of FIG. 5.

The compressor inlet air control system may include an anti-rumble system 50 as shown in FIGS. 5 and 7. The anti-rumble system 50 is formed within the upper housing 110. The system includes an anti-rumble control valve 500 which controls the flow of pressurized air to a vent passage 530 and a connection passage 560 to the air compressor inlet B. The control valve 500 is biased upwardly against a valve control seat by air pressure in a chamber 565 located below the anti-rumble valve piston 510. The chamber 565 receives air from the control air header 480 through an air passage 540, as shown in FIG. 7. When the force applied on the top of the piston 510 by air pressure from the discharge side of the air compressor is sufficient to overcome the force on the bottom of the piston 510 the anti-rumble valve will open allowing air from the discharge side of the air compressor to be released through the vent path 530 and to the inlet of the air compressor through a connecting passage 560. The piston 510 has a varying cross-section so that a small amount of air pressure in chamber 565 is sufficient to maintain the valve 500 closed. Thus, the anti-rumble valve will open when the control air header 480 is depressurized and the main unloader valve is shut. The positioning of the anti-rumble valve 500 allows the flow of air to the vent passage 530 and to the inlet of the compressor through passage 560 to be controlled by a single valve. As described above, the air emitted through the vent passage 530 includes a small amount of entrained oil for lubricating the main unloader valve components. As shown in FIG. 7, the anti-rumble system may further include a check valve 520. The check valve may be a ball type valve and is included to prevent the backflow of oil and pressurized air when the unloader valve is shut and the compressor is secured.

Operation

Operation of the unloader valve, anti-rumble system, and control air systems will now be discussed. Prior to starting the associated air compressor the unloader valve is closed, as shown in FIG. 8. When the compressor starts, the initial air supply is provided by leakage past the sleeve 120 of the unloader valve through clearance 155. As air pressure on the discharge side of the compressor begins to rise, air is supplied to the control air manifold 405 through upper passage 410 and to the unloader control valve 300 through passage 430. The pressurized air passes through the clearance 350 around the lower section 303 of the control valve 300 and into the control air header 480.

As compressor discharge pressure continues to rise pressure in the control air passage 355 increases in conjunction with the pressure in the control air header 480. When pressure in the control air passage 355 and the guide rod chamber 165 is sufficient to overcome the downward force of spring 142 the sleeve 125 moves upward and the unloader valve opens. As shown in FIG. 4, air flows through the sleeve and into the inlet of the air compressor. As pressure in the control air header 480 and control air passage 355 continues to rise, the sleeve 125 moves further upward. The sleeve 125 continues to move upward until it contacts its upper stop 112. The upper stop 112 is located on the upper housing section 110 and is configured to contact an outwardly protruding section of the sleeve. When the sleeve 125 reaches the upper stop 112, the unloader valve is fully open.

Preferably, the unloader valve starts to open when compressor discharge pressure reaches approximately 50 psi and is fully open when compressor discharge pressure reaches approximately 100 psi. The unloader valve will remain fully open until the discharge pressure of the compressor reaches a predetermined value. When the discharge pressure reaches the predetermined value the control valve 300 will start to open and pressure in the middle passage 355 will begin to lower as it is vented through the vent path 490.

The unloader valve 10 will begin to close. The sleeve 125 will begin to drop as compressor discharge pressure continues to increase. Pressure in the control air header 480 will drop as it is vented through the control valve 300 and the vent passage 490. When pressure in the guide rod chamber 165 drops below the minimum level required to maintain the unloader valve open, the unloader valve will close. The control valve 300 opens fully venting the control air header 480 to atmosphere. The anti-rumble valve 500 will open.

The process described above may be used, for example, to control a typical 350 psi rotary screw compressor. The table below shows the position of the unloader and anti-rumble valve for the 350 psi compressor example.

| Compressor Discharge Pressure (psi) | Unloader Valve Position | Anti-Rumble Valve Position |
|---|---|---|
| 0 | Closed | Open |
| 50 | Starts to Open | Open |
| 100 | Fully Open | Closed |
| 350 | Starts to Close | Closed |
| 390 | Closed | Open |

Following the closing sequence in the above table, as compressor discharge pressure decreases the unloader valve begins to open.

The setpoint at which the unloader valve starts to close may be adjusted through use of the unloader valve control system 30. As described above, the system 30 includes a Hi/Lo chamber 315. Pressure in the Hi/Lo chamber is controlled by the Hi/Lo valve 475. The Hi/Lo valve 475 is closed to maintain a higher set point at which the unloader will start to close. When the Hi/Lo valve 475 opens the control valve 300 will start t open at a lower pressure (e.g. 250 psi instead of 350 psi in the above table). The set points may also be varied in smaller movements if, for example, a computer controlled linear motor is attached to the adjustment screws 360, 365. The compressor may be set to operate with a reduced pressure limit in high temperature conditions, for example. The control of the unloader valve during operation may be referred to as the automatic mode of control.

The unloader valve may also be shut by blocking the supply of pressurized air to control valve 300. When normally open unloader shutdown valve 435 is closed pressurized air cannot reach the main unloader control system 30.

Thus, the control air header 480 depressurizes and the unloader valve will close.

The system also ensures that the unloader valve will shut when the compressor stops running. When the compressor is running and the unloader valve is open as shown in FIG. 4, the seating member 130 is forced downward by the flow of air traveling through the sleeve 125. If the compressor stops, air flow through the sleeve 125 will stop. The spring 135 acts on the bottom of the seating member 130 to force it upward against the raised sleeve 125. Thus, the unloader valve 10 closes even though the control air header 480 is pressurized to force the unloader valve open. The unloader shutdown valve 435 may be operated so that when compressor shut down is sensed the valve shuts to depressurize the control air header 480 so that the unloader valve also shuts.

As discussed above, the anti-rumble system 50 is required to protect the rotary screws from damage when they are operated with the unloader valve shut. When the control air header 480 depressurizes and the unloader valves close with the compressor operating, discharge pressure in the anti-rumble supply header 470 forces the anti-rumble piston 510 downward. The open passage allows air to be emitted to the compressor inlet B through the connecting passage 560. At the same time, the excess pressure on the compressor discharge side is vented through vent path 530 which supplies air containing a small amount of oil to the unloader valves for lubrication and to prevent excess pressure from building upon the separator tank.

Given the disclosure of the present invention, one versed in the art would appreciate that there may be other embodiments and modifications within the scope and spirit of the invention. Accordingly, all modifications attainable by one versed in the art from the present disclosure within the scope and spirit of the present invention are to be included as further embodiments of the present invention. The scope of the present invention is to be defined as set forth in the following claims.

What is claimed is:

1. An inlet unloader valve for a rotary compressor comprising:
    a hollow sleeve having top and bottom open ends, the bottom end defining a circumferential bottom seating surface;
    a spring for biasing the sleeve downward toward a seated condition; and
    wherein the sleeve is moveable between an open condition wherein air flows into the open top, through the hollow interior of the sleeve and under the circumferential bottom seating surface and the seated condition wherein air can not flow through the sleeve.

2. The unloader valve of claim 1 further comprising a seating member positioned below the sleeve so that the bottom seating surface contacts the seating member to close the valve.

3. The unloader valve of claim 2, wherein the seating member is biased upwardly toward the sleeve.

4. The unloader valve of claim 3, wherein the seating member is adapted for upward and downward movement in the axial direction of the sleeve.

5. The unloader valve of claim 1, further comprising a centrally located guide rod disposed within the sleeve and extending along the longitudinal axis of the sleeve, thereby providing a guide when the sleeve moves in the axial direction.

6. The unloader valve of claim 5, wherein the sleeve includes a centrally located hub for receiving the guide rod.

7. The unloader valve of claim 5, wherein the guide rod passes through the seating member.

8. The unloader valve of claim 5, further comprising a valve housing including a mechanical stop that contacts the sleeve and limits the upward motion of the sleeve.

9. The unloader valve of claim 8, wherein the rod is secured to the valve housing.

10. The unloader valve of claim 1, wherein the valve is closed when the compressor is shutdown.

11. The unloader valve of claim 1, further comprising an air passage for carrying control air to the bottom of the sleeve for forcing the sleeve in the upward direction to open the valve.

12. The unloader valve of claim 1, wherein the sleeve is cylindrical.

13. The unloader valve of claim 12, wherein the sleeve includes a serrated bottom edge.

14. The unloader valve of claim 1, wherein the valve permits leakage past the valve when the valve is in a seated condition.

15. The unloader valve of claim 14, wherein the valve includes a clearance between the exterior of the sleeve and a valve housing to provide for the leakage.

* * * * *